United States Patent Office 2,809,221
Patented Oct. 8, 1957

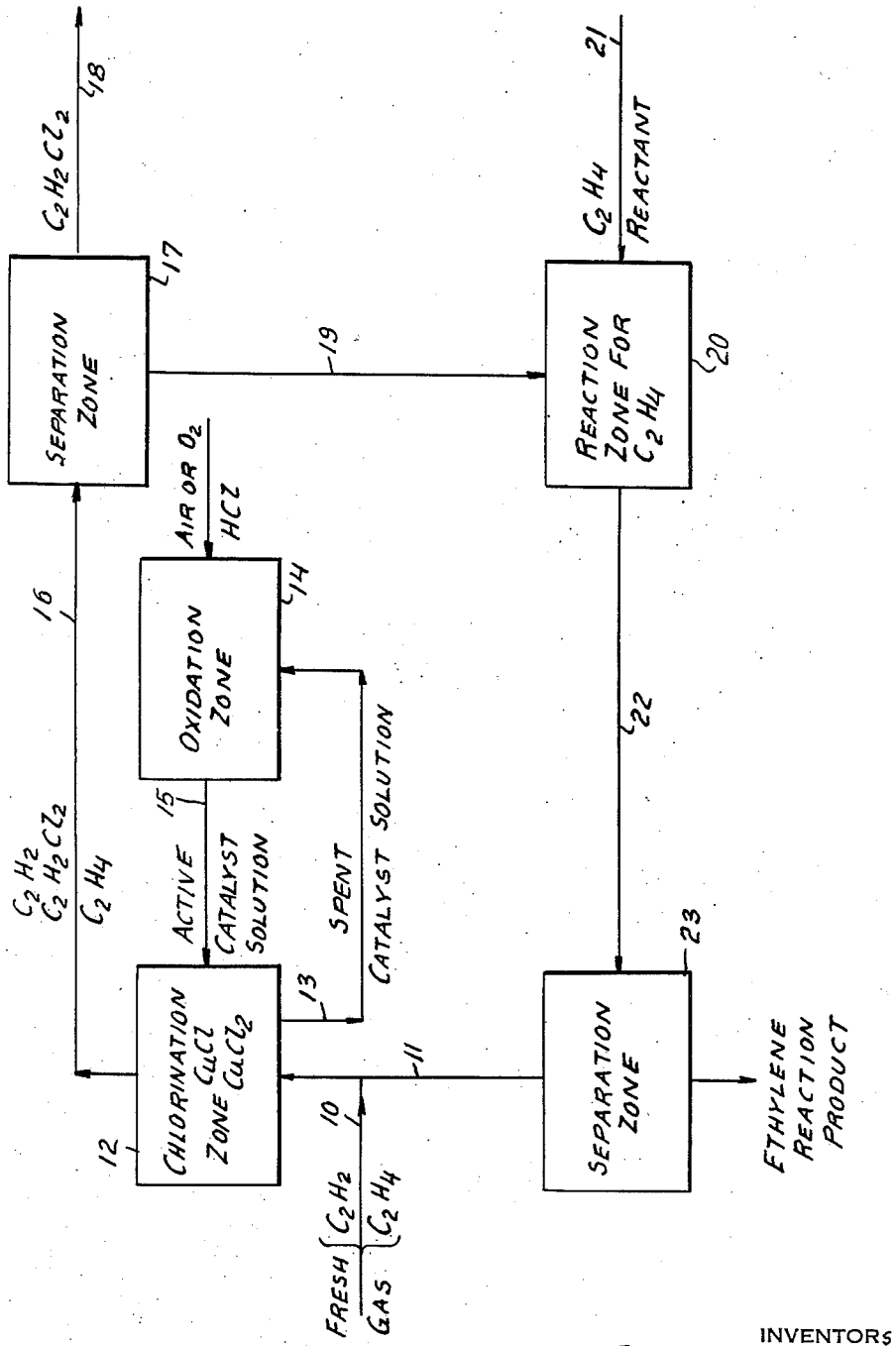

2,809,221

SELECTIVE CHLORINATION

Robert M. Thomas, Niagara Falls, and John W. Churchill, Kenmore, N. Y., assignors to Olin Mathieson Chemical Corporation, a corporation of Virginia Application June 11, 1952, Serial No. 292,901

1 Claim. (Cl. 260—654)

This invention relates to the utilization of acetylene-ethylene mixtures such as those obtained by the cracking of relatively saturated hydrocarbons. More particularly it relates to the liquid phase chlorination of acetylene in such mixtures to transdichloroethylene, simultaneously producing a residue gas enriched in ethylene. In a more particular aspect, it relates to a combined process in which the residue gas may be converted into useful ethylene derivative products by reaction with a selective reagent in a second stage.

The production of mixed unsaturated gases by the drastic cracking or dehydrogenation of relatively saturated charge stocks, particularly ethane, ethane-propane mixtures and heavier hydrocarbons is well known. Various processes are available for the production of such unsaturated mixtures comprising various proportions of acetylene, ethylene and hydrogen with minor amounts of other products as impurities.

By so-called "shallow" cracking, about 30-35% of unsaturates may be obtained in the resulting gas and the yields of acetylene and ethylene total about 70-75%. Where ethylene is the product principally desired, the dehydrogenation conditions may be controlled so as to produce the maximum yield of ethylene and the minimum producton of acetylene. Selective hydrogenation of the acetylene to ethylene can be used to produce a gas fairly readily separable into an ethylene component free of acetylene and other contaminants. In spite of the waste of the acetylene produced, much ethlyene has been prepared by this process.

Where acetylene is the primary product desired, the cracking must be extremely severe. Such operations, usually termed "deep" cracking, in general require rapid heating combined with quick quenching to produce satisfactory yields and conversions. Yields of only about 50-55% of acetylene in concentrations of 15-17% in the gas are obtained. Ethylene is usually absent. The conditions for deep cracking provided, for example, by the use of regenerative furnaces are so severe that even the best of modern refractories have a relatively short life. Extensive purification operations are necessary to separate acetylene from the cracked gases. To obtain pure acetylene, the industry has alternatively turned to the calcium carbide method of generation. The cost of acetylene by the latter method is about the same as by cracking hydrocarbons, taking into account the expensive purification required following the cracking process.

Thus acetylene and ethylene are obtainable as chemical individuals by cracking saturated hydrocarbons, but each requires separation and purification steps largely nullifying the economic advantage of low raw-materials cost. Although the unsaturates may be separated readily from hydrogen, methane and the heavier ends in such mixtures, by well known means, for example, adsorption and desorption, and thus acetylene-ethylene mixtures relatively free of other constituents may be produced, the further separation of acetylene from ethylene by physical methods, for example, distillation under pressure or by the use of selective solvents is too expensive to be economically feasible. Hence, utilization of the low cost shallow cracking process for producing mixtures of acetylene and ethylene which has a theoretically tremendous economic advantage over the deep cracking processes is not feasible because of the difficulty and expense of physically separating the two unsaturates.

We have found however that it is possible to utilize acetylene-ethylene mixtures derived from hydrocarbon cracking operations directly in the production of dichloroethylene without pre-separation of the unsaturates by chlorinating such mixtures in the liquid phase by contact with a liquid phase Deacon type composition comprising a mixture of copper chlorides. The chlorinating activity of the composition is maintained by contacting it with hydrogen chloride and an oxygen-bearing gas such as air or free oxygen in the chlorination zone or a separately operated oxidation zone. The chlorination temperature is within the range of about 50° to 200° C., preferably within the range of about 50° to 100° C. The composition comprises a mixture of cuprous chloride and cupric chloride which is made up as an aqueous slurry at room temperature but which is a liquid solution at the reaction temperature. Advantageously, ammonium chloride or an alkali metal salt such as sodium or potassium chloride is added to promote solubility. The aqueous medium also usually contains about 1-35% hydrogen chloride. The total salts content ordinarily is of the order of 25-50% by weight of the solution. By this chlorination means we have been able to convert mixtures of acetylene and ethylene in a highly selective manner in excellent yields to transdichloroethylene while recovering a residual gas stream enriched in ethylene. The extent of acetylene consumption in the chlorination zone may be varied by selection of operating conditions and equipment sizing and the charge gas stream may be subjected to successive re-treatment to obtain the desired acetylene conversion. In large scale operations it is advantageous to combine the chlorination process of our invention with a subsequent reaction in which the residual gas enriched in ethylene is reacted with an agent selective for ethylene in the presence of acetylene to produce an ethylene reaction product. In this event, it is highly advantageous to control the extent of conversion in the chlorination zone and in the ethylene reaction zone in a manner balancing the consumption of acetylene and ethylene whereby an ultimate residual gas stream containing acetylene and ethylene in proportions suitable for recycle with fresh feed gas to the chlorination zone under steady state conditions is obtained.

In operation of the chlorination a space velocity of the order of 5 to 500 per hour in terms of volume of gas feed to volume of solution is provided. The activity is maintained by maintaining hydrogen chloride concentration between about 1% and 35%. The concentration may be maintained by charging hydrogen chloride and air or oxygen to the chlorination zone or by withdrawing continuously or periodically spent catalyst solution from the chlorination zone and contacting with hydrogen chloride and air or oxygen in a separate oxidation zone from which active solution is recirculated to the chlorination zone. The temperature in the oxidation zone may vary over a somewhat wider range than that in the chlorination zone but advantageously is within the range of 20° to 100° C.

The feed gas in the present invention may comprise a major proportion of acetylene or ethylene and the cracking operation may be controlled to produce these components in any proportions desired in the products of chemical conversion. Suitable gas mixture for use according to the present invention may be obtained by cracking saturated hydrocarbons or mixtures of saturated hydrocarbons at temperatures between about 1100° and 1600° C. or higher using short contact times. Cracking conditions are controlled to yield a product containing acetylene and ethylene in any desired proportion but preferably in about equimolar quantities. Usually substantially all of the saturates are cracked in one pass.

The hydrocarbon starting material may comprise normally gaseous and/or normally liquid saturated hydrocarbons from any suitable source, for example, natural gas, casinghead gasoline, natural gasoline, naphtha fractions or even higher boiling hydrocarbon fractions. Preferably, however, a relatively pure ethane fraction is used as charge stock. Cracking under shallow cracking conditions produces a particularly desirable mixture comprising largely ethylene, acetylene and hydrogen uncontaminated by other olefins or unsaturated hydrocarbons. In contrast, using propane or propane-containing fractions as feed stock, considerable proportions of propylene may be present in the gas. However such unsaturated mixtures containing propylene, for example, may be used in the process of the present invention when the mixed olefins are to be converted in multi-stage operation, for example, to mixed chlorohydrins and thence to oxides. The latter are readily separable by distillation or may be utilized for the preparation of mixed glycols or other reaction products. Alternatively, propylene is readily separable from ethylene by absorption in sulfuric acid of appropriate concentration.

Deep cracking of charge stocks containing appreciable amounts of propane and higher hydrocarbons produces mixtures substantially free of higher molecular weight unsaturates and may be used to produce suitable unsaturated gas mixtures for use according to the present invention.

In the cracking operation any suitable type of reactor enabling the conversion of saturated hydrocarbons into unsaturated hydrocarbons comprising ethylene and acetylene may be employed. Tubular furnaces may be employed for the shallow cracking of ethane but particularly for the cracking of higher saturated hydrocarbons, regenerative type furnaces or pebble furnaces are advantageous. In the former the hydrocarbons are passed through narrow elongated passages defined by non-catalytic refractory material of high heat conductivity, for example, silicon carbide. In pebble furnaces the hydrocarbons are passed through beds of pebbles or fragments of refractory material maintained at cracking temperatures by the combustion of waste gas in a separate zone. The conditions necessary comprise the use of temperatures within the range of about 1100° to 1600° C. and preferably from about 1200° to 1350° C. Atmospheric or subatmospheric pressure may be maintained within the cracking zone. Contact times do not usually exceed 25 seconds and preferably are not more than about 15 seconds. Suitable quenching means are used to restrict the reaction periods. Steam or other inert gas may be added to the hydrocarbon charged to provide conditions suitable for the conversion to mixtures of acetylene and ethylene. The relative proportions of these two components in the cracked product may be controlled by varying the cracking conditions within the above defined limits. Usually an increase in temperature and an increase in contact time within these ranges serves to increase the proportion of acetylene. The effluent gas from the cracking unit is suitably separated, for example, by adsorption and desorption into a hydrogen-saturated hydrocarbon fraction, an acetylene-ethylene fraction and a fraction of higher boiling components.

The mixture of acetylene and ethylene obtained by separation of the unsaturates from the other components of the cracked gas is then chlorinated in the liquid phase in the presence of copper chlorides to convert the contained acetylene into transdichloroethylene. More specifically, the mixture of acetylene and ethylene with 2 moles of hydrogen chloride per mole of acetylene and an excess of air may be passed through a solution containing cuprous chloride, cupric chloride and ammonium chloride in aqueous hydrochloric acid. Using this solution, a major proportion of the acetylene charged is reacted and converted to dichloroethylene. Ethylene does not react under these conditions. The dichloroethylene is separated by partial condensation or scrubbing and a residual gas stream enriched in ethylene is recovered. Usually with suitable proportions of reagents, time of contact and other conditions, it is thus possible to obtain ethylene of the desired purity in a single pass. However, the gas may be passed through several chlorination stages until the acetylene content is reduced to less than any desired amount. Substantially pure ethylene is thus obtained as a residue gas.

In one form of this invention the solution may be circulated at a suitable temperature, for example, 80° C. over a tower packed with an inert packing, for example, porcelain Berl saddles. The hydrocarbon gas stream may be introduced near the base of the tower to flow countercurrently to the solution. Exit gases may be cooled to remove liquid dichloroethylene, passing the stripped gases to a similar second chlorination stage. The effluent liquor flows to a regeneration tower similarly packed in which air countercurrently oxidizes cuprous to cupric chloride. Reactivated solution is pumped from the base of the reactivation tower to the tops of the chlorination towers to complete the cycle in a continuous manner.

Advantageously, however, a multi-stage operation is conducted in which a residual gas stream enriched in ethylene but containing acetylene is withdrawn from the first reaction zone and is utilized in a second reaction zone by means of a reagent selective for ethylene to convert the ethylene into useful derivatives. Residual acetylene-ethylene mixtures from the second stage by control of the extent of the two reactions may be recycled to the acetylene removing stage with fresh feed. Should any inert content of the gas build up, suitable proportions are recycled to the primary unsaturates separating step.

The hydrogen chloride used in the process of the present invention is advantageously by-product hydrogen chloride from other processes. It may be derived, for example, from organic chlorinations, by dehydrochlorination of ethylene dichloride or other chlorine compounds or from other sources. It is a particular and unexpected advantage of the process of this invention that by-product as well as relatively pure hydrogen chloride may be used satisfactorily since in many cases such by-product hydrogen chloride is not sufficiently pure for reuse.

The resulting transdichloroethylene is useful for the manufacture of vinylidene chloride by the addition of hydrogen chloride and subsequent demuriation, for the preparation of trichloroethylene by the addition of chlorine and subsequent demuriation and for the preparation of perchloroethylene by the addition of chlorine to trichloroethylene and demuriation of the resulting pentachloroethane to tetrachloroethylene.

In the two-stage operation of the present invention, the residual gas stream from the first stage, freed of dichloroethylene and excess reagents used in the first stage and comprising principally ethylene with some unreacted acetylene, is treated with selective reagents to produce ethylene reaction products without substantial reaction of the acetylene. The residual ethylene, for example, may be converted by one of the following treatments:

(1) Ethylene chlorohydrin may be prepared in good yields and with good conversions as described in pending application Serial No. 292,955, filed June 11, 1952, of Bruno H. Wojcik, now abandoned, by introducing the gas mixture in an appropriate manner with chlorine into an aqueous reaction system under chlorohydrination conditions to convert the ethylene to ethylene chlorohydrin. Surprisingly, the acetylene contained in the gas passes through the chlorohydrination reaction without change and may subsequently be recycled to the first stage.

(2) By liquid phase chlorination in a chlorohydrocarbon solvent particularly in the presence of iron or iron chloride catalysts, as described in pending application Serial No. 293,581, filed June 14, 1952, of Victor C. Fusco, ethylene may be converted to ethylene dichloride while acetylene is substantially unaffected.

(3) The residual ethylene may also be converted to ethyl chloride by admixture with hydrogen chloride and passage over a catalyst as described in pending application Serial No. 292,847, filed June 11, 1952, of Ernest H. Millard, Jr., now U. S. Patent No. 2,779,805. For example, hydrogen chloride in sufficient quantity to be stoichiometrically equivalent to the ethylene present in the charge gas is passed over a zinc chloride-impregnated carbon catalyst at about 160° C. to convert the ethylene to ethyl chloride and minor proportions of acetylene to vinyl chloride. Surprisingly, under these conditions acetylene is converted only in relatively minor proportions. Vinyl chloride and ethyl chloride are carried out by the residue gas. They are separated from the gas stream by refrigeration and fractionated. The stripped gas is recycled to the first or acetylene-separating step of the present process.

(4) Styrene may be prepared from the ethylene-rich residue gas from the first stage, particularly when multiple passes have materially reduced the acetylene content, by passing it together with benzene over suitable catalysts in the vapor phase. For example, a mixture of about 3 to 6 moles of benzene per mole of ethylene in the residue gas is introduced at a pressure of 20 to 60 p. s. i. over a catalyst consisting of phosphoric acid on kieselguhr at a temperature of about 275° C. The resulting ethyl benzene is separated, fractionated and thermally or catalytically dehydrogenated to form styrene.

Our invention will be further described by reference to the accompanying drawing in which a simplified flow diagram of our invention is shown. The charge gas mixture, e. g. a mixture of unsaturates approximating equimolar proportions of acetylene and ethylene derived from ethane cracking for example, is introduced to the system as indicated by line 10 and together with recycle gas in line 11 is charged to chlorination zone 12. In the chlorination zone, the charge gas mixture is contacted with cupric chloride in an aqueous slurry containing cuprous chloride and ammonium chloride. The aqueous system following contact with the charge gas is withdrawn from chlorination zone 12 as indicated by line 13 and reactivated in oxidation zone 14 by contact with a mixture of air or oxygen and hydrogen chloride. The reactivated solution as indicated by line 15 is recirculated to the chlorination zone. The effluent reaction mixture is passed as indicated by line 16 to separation zone 17 wherein transdichloroethylene is recovered as a product as indicated by line 18. The unreacted gas stream then may be passed as indicated by line 19 to ethylene reaction zone 20 to be contacted with a reactant selective for ethylene in the presence of acetylene which as shown is introduced by line 21. The resulting reaction mixture is passed as indicated by line 22 to a second separation zone 23. In the operations of the second separation zone, the ethylene reaction product is recovered and the residual unreacted gas may be separated for recycle through line 11.

The following examples illustrate the liquid phase chlorination process under varying conditions of operation:

*Example I*

A gas mixture comprising 0.61 mole of acetylene and 0.76 mole of ethylene was passed through an aqueous solution containing 50% solids and comprising, per one thousand parts by weight of solution, 172 parts of cuprous chloride, 293 parts of cupric chloride ($CuCl_2 \cdot 2H_2O$), 98 parts of ammonium chloride, 340 parts of concentrated hydrochloric acid and 99 parts of additional water. The temperature was maintained at 80–82° C. Dichloroethylene and water were removed from the gas by refrigeration. The former amounted to 0.39 mole, corresponding to a yield based on acetylene consumed of 81% and on acetylene charged of 64%. The residual gas, comprising 0.13 mole of acetylene and 0.76 mole of ethylene may be passed to a second stage similar to the first to reduce the acetylene content further. Alternatively the gas may be treated for the conversion of the ethylene content to ethylene chlorohydrin by the process described in the Wojcik application identified in column 4, lines 71 and 72.

*Example II*

A solution was prepared by dissolving 437 parts of cuprous chloride, 755 parts of cupric chloride $$(CuCl_2.2H_2O)$$

and 474 parts of ammonium chloride in 320 parts of concentrated hydrochloric acid and 1950 parts of additional water. The solution contained 38.4% of solids and about 5% hydrochloric acid. It was heated to about 80–98.5° C. and a gas mixture comprising 3.12 moles of acetylene and 2.64 moles of ethylene was passed therethrough. Dichloroethylene was condensed from the gas by refrigeration and amounted to 1.77 moles corresponding to a yield of 56% based on the acetylene charged and 78% based on acetylene converted. After separating the product, the exit gas was analyzed and indicated to contain 0.85 mole of acetylene and 2.70 moles of ethylene. It was suitable for treatment in a chlorohydrination reaction for conversion of contained ethylene to ethylene chlorohydrin as described in Wojcik application referred to in column 4, lines 71 and 72, for the conversion of ethylene to ethylene dichloride by the process of Fusco application identified in column 5, lines 6 to 8 or for conversion of the contained ethylene to ethyl chloride by the process of Millard application identified in column 5, lines 11 to 13.

*Example III*

A solution was prepared from 218 grams of cuprous chloride, 377 grams of cupric chloride ($CuCl_2.2H_2O$), 237 grams of ammonium chloride, 160 grams of concentrated hydrochloric acid and 975 grams of water. A gas mixture containing acetylene and ethylene in the molar ratio of 1 to 2.5 was passed into the catalyst solution at 77–83° C. for about 7.25 hours. Dichloroethylene amounting to 67 grams was removed from the exit gas by refrigeration. Acetylene absorption ceased at the end of this period and the solution was reactivated by passing air through the solution at 66–76° C. at the rate of about 1 mole per hour for 0.5 hour. The flow of hydrocarbon gas in the same proportions and at the same rate as before was resumed and continued for a period of 4.5 hours. Dichloroethylene amounting to 23 grams was extracted from the gas. Reactivation was effected by the addition of concentrated hydrochloric acid and the passage of air at the rate of 2.25 moles per hour for 2 hours. Resuming the hydrocarbon gas flow as before, the solution then produced 30 grams of dichloroethylene in a period of 2 hours. The hydrocarbon gas after removal of dichloroethylene was suitable for treatment in further chlorination stages to reduce the acetylene content to any desired amount after which the concentrated ethylene gas may be used for the manufacture of styrene as described in column 5, lines 26 to 36.

We claim:

The process of selectively chlorinating acetylene in an acetylene and ethylene mixture which comprises passing the acetylene-ethylene mixture through an aqueous solution of cuprous and cupric chlorides containing about 1–35% hydrogen chloride, said solution being maintained at a temperature of 50–200° C. and separating the resulting transdichloroethylene from the reaction mixture.

References Cited in the file of this patent

UNITED STATES PATENTS 2,520,712    Cheney  ---------------- Aug. 29, 1950

FOREIGN PATENTS 558,888    Great Britain ------------ Jan. 26, 1944